United States Patent
Van Wynsberghe et al.

[19]

[11] Patent Number: 5,906,394
[45] Date of Patent: May 25, 1999

[54] COMPLETELY NON-PYROTECHNIC AIR BAG INFLATOR

[75] Inventors: Roy D. Van Wynsberghe; Bryan W. Shirk, both of Mesa, Ariz.

[73] Assignee: TRW Inc., Lyndhurst, Ohio

[21] Appl. No.: 08/972,941

[22] Filed: Nov. 18, 1997

[51] Int. Cl.$^6$ .................................................. B60R 21/26
[52] U.S. Cl. ................................................ 280/737; 222/5
[58] Field of Search .................................. 280/737, 741; 222/3, 5; 102/530, 531

[56] References Cited

U.S. PATENT DOCUMENTS

| | | |
|---|---|---|
| 3,648,898 | 3/1972 | Day . |
| 3,777,772 | 12/1973 | Arnold et al. ........................... 280/737 |
| 3,887,108 | 6/1975 | McDaniel et al. . |
| 4,289,327 | 9/1981 | Okada . |
| 5,046,426 | 9/1991 | Julien et al. . |
| 5,527,066 | 6/1996 | Svensson ................................ 280/737 |
| 5,820,162 | 10/1998 | Fink ....................................... 280/737 |

OTHER PUBLICATIONS

Article entitled "A Very Low Shock Alternative to Conventional, Pyrotechnically Operated Release Devices", pp. 222–231, Feb. 1, 1994.

*Primary Examiner*—Paul N. Dickson
*Attorney, Agent, or Firm*—Tarolli, Sundheim, Covell, Tummino & Szabo

[57] ABSTRACT

The present invention relates to an apparatus (2) for helping to protect a vehicle occupant in the event of sudden vehicle deceleration. The apparatus (2) comprises an inflatable vehicle occupant restraint (4) and an inflator (10, 110) having a chamber (42, 142). A stored inflation fluid (44, 144) for inflating the restraint (4) is disposed in the chamber (42, 142). A device for controlling flow of the inflation fluid (44, 144) from the chamber (42, 142) to the restraint (4) is provided. The device includes a member (40, 200) which has a first mechanical strength when no electric current is applied to the member and a second mechanical strength lower than the first mechanical strength when electric current is applied to the member.

14 Claims, 2 Drawing Sheets

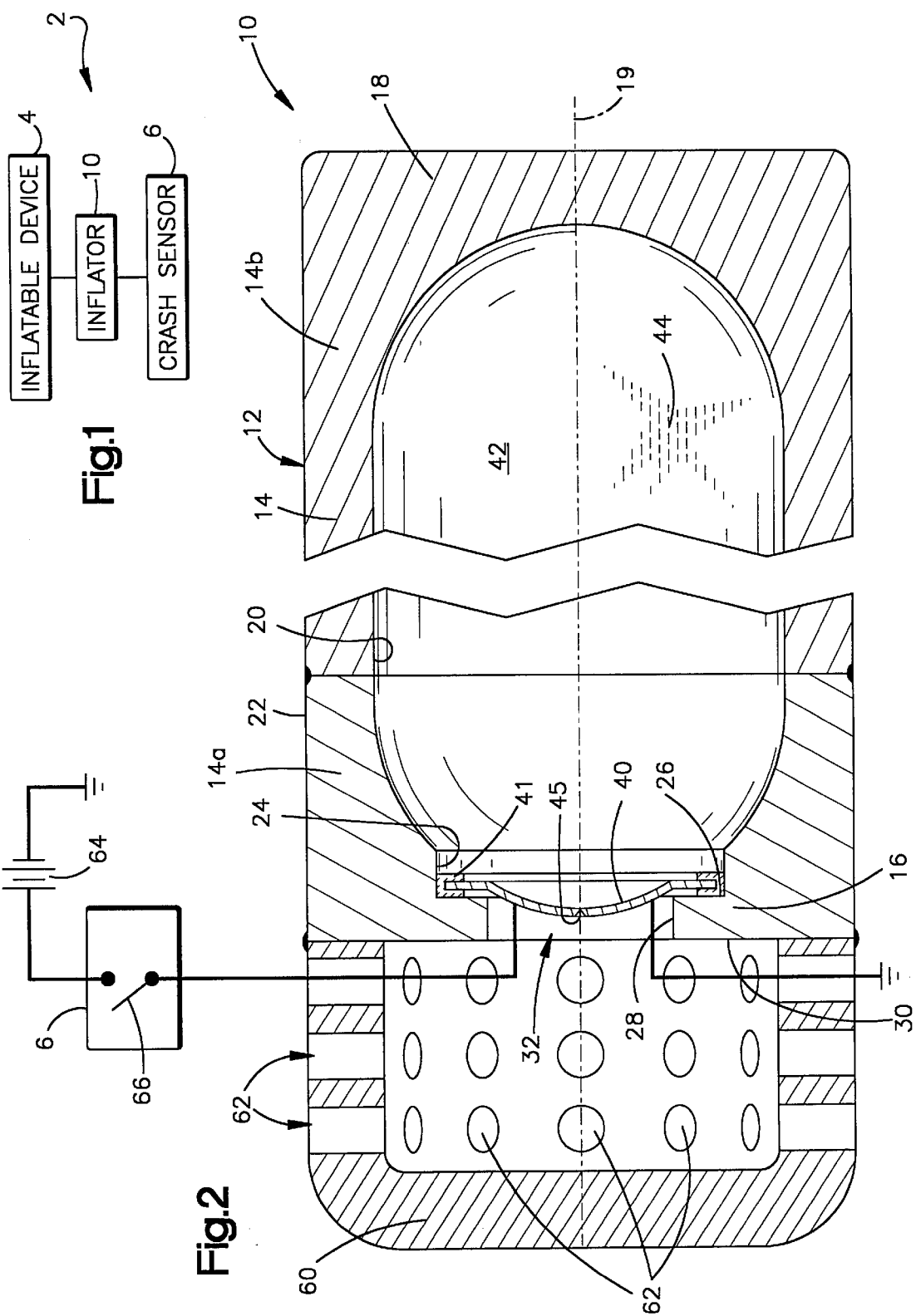

COMPLETELY NON-PYROTECHNIC AIR BAG INFLATOR

TECHNICAL FIELD

The present invention relates to an apparatus for helping to protect a vehicle occupant in the event of sudden vehicle deceleration, and particularly relates to an inflator for an inflatable vehicle occupant protection device, such as an air bag.

BACKGROUND OF THE INVENTION

A known inflator for inflating a vehicle occupant protection device, such as an air bag, includes a gas stored in a chamber of a container. A pyrotechnic charge is typically required to release the stored gas to inflate the air bag. It is desirable to be able to inflate an air bag without the use of a pyrotechnic charge.

SUMMARY OF THE INVENTION

The apparatus of the present invention comprises an inflatable vehicle occupant restraint and an inflator having a chamber. A stored inflation fluid, for inflating the restraint, is disposed in the chamber. Means is provided for controlling flow of the inflation fluid from the chamber to the restraint. The means includes a member which has a first mechanical strength when no electric current is applied to the member and a second mechanical strength, lower than the first mechanical strength, when electric current is applied to the member.

BRIEF DESCRIPTION OF THE DRAWINGS

The foregoing and other features of the invention will become more apparent to one skilled in the art upon consideration of the following description of the invention and the accompanying drawings in which:

FIG. 1 is a schematic view of a vehicle occupant protection system embodying the present invention;

FIG. 2 is a schematic view partly in section of parts of the vehicle occupant protection system of FIG. 1.

DESCRIPTION OF PREFERRED EMBODIMENTS

Figure 3:
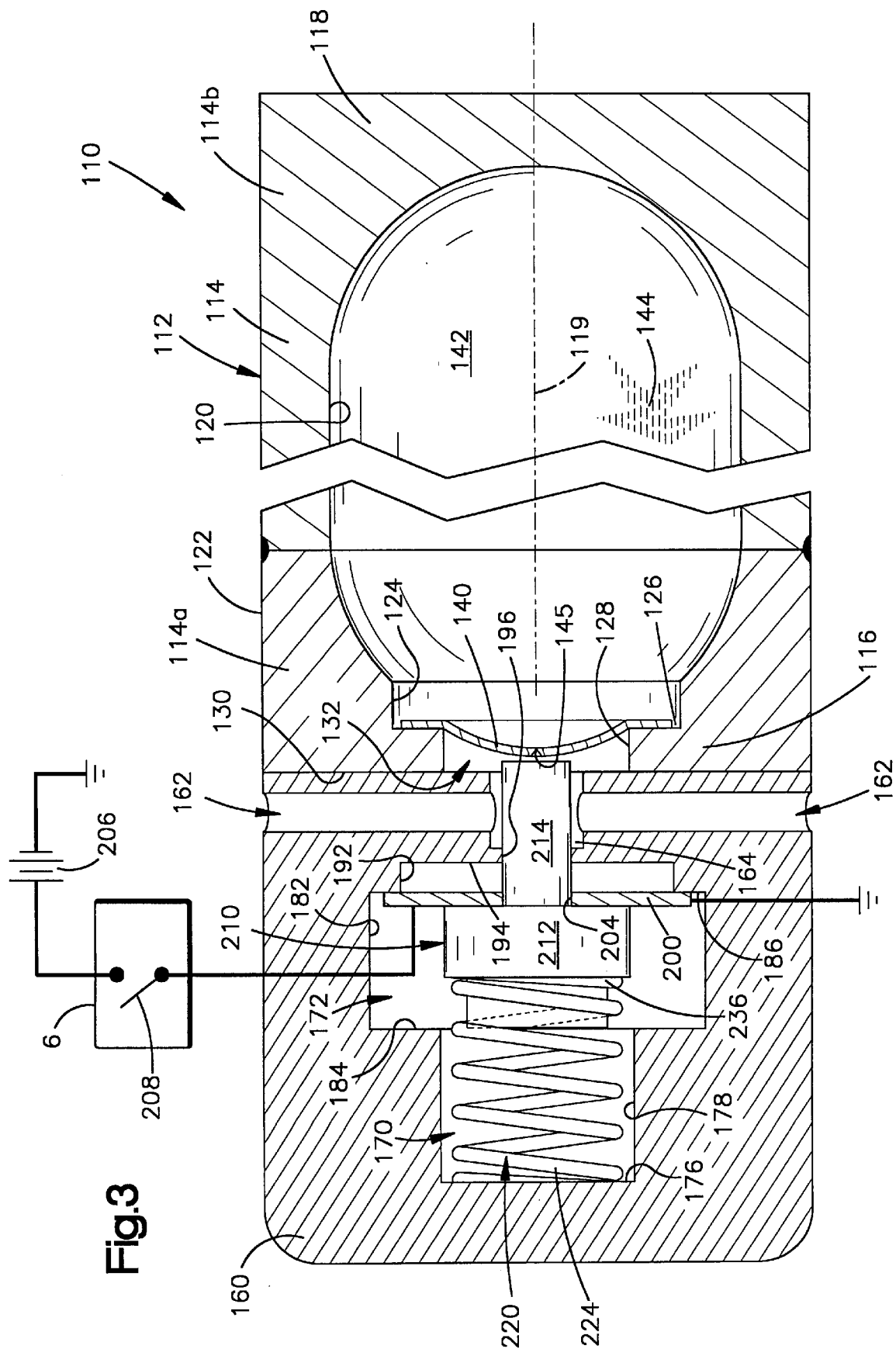
FIG. 3 is a view similar to FIG. 2 illustrating a second embodiment of the present invention.

Referring to FIG. 1, a vehicle occupant protection system 2 includes an inflatable vehicle occupant protection device 4. In the preferred embodiments of the present invention, the inflatable vehicle occupant protection device 4 is an air bag. The inflatable vehicle occupant protection device could be, for example, an inflatable seat belt, an inflatable knee bolster, an inflatable head liner or side curtain, or a knee bolster operated by an inflatable air bag.

An inflator 10 is associated with the inflatable air bag 4. The inflator 10 is actuatable to direct inflation fluid to the air bag 4 to inflate the air bag.

The system 2 also includes a crash sensor 6. The crash sensor 6 is a known device that senses a vehicle condition, such as vehicle deceleration, indicative of a collision. The crash sensor 6 measures the magnitude and duration of the deceleration. If the magnitude and duration of the deceleration meet or exceed predetermined threshold levels, a deployment signal is then transmitted to the inflator 10 to actuate the inflator.

When the inflator is actuated, it directs inflation fluid into the air bag 4 to inflate the air bag. When the air bag 4 is inflated, it extends into the occupant compartment of the vehicle to help protect a vehicle occupant from a forceful impact with parts of the vehicle due to a vehicle collision.

In a first embodiment, the inflator 10 includes a container 12 made of a suitable material, such as steel or aluminum. The container 12 includes a generally cylindrical side wall 14 extending along a central longitudinal axis 19. The side wall 14 comprises a first portion 14a friction welded to a second portion 14b. The side wall 14 extends between and connects an open end 16 and a closed end 18 of the container 12. The side wall 14 includes a generally cylindrical inner surface 20 and a generally cylindrical outer surface 22.

The open end 16 of the inflator 10 includes a first cylindrical surface 24 extending axially between and connecting the inner surface 20 and a radially extending first annular surface 26. A second cylindrical surface 28, having a diameter smaller than the diameter of the first cylindrical surface 24, extends axially between and connects the first annular surface 26 and a radially extending second annular surface 30. The second cylindrical surface 28 and the second annular surface 30 define a circular opening 32 in the container 12.

A burst disk 40 is secured to the first annular surface 26 by a glass-to-metal seal 41. The burst disk 40 includes a plurality of score lines 45. The score lines 45 extend radially from the center of the burst disk 40. The burst disk 40 closes the opening 32 of the container 12 to define a closed chamber 42 in the container 12. Specifically, the chamber 42 is defined by the cylindrical inner surface 20, the first cylindrical surface 24, the glass-to-metal seal 41 and the burst disk 40. The glass-to-metal seal 41 electrically isolates the burst disk 40 from the container 12.

A supply of gas 44 for inflating the air bag 4 is stored in the chamber 42. The stored gas 44 in the preferred embodiment of the invention comprises an inert gas such as air, nitrogen, helium, argon, or a mixture of these gases. Preferably, the stored gas 44 includes at least a small amount of a tracer gas, such as helium, for helping to detect gas leaks, as is known.

The stored gas 44 within the container 12 is under pressure. The pressure depends upon such factors as the volume of the air bag 4 to be inflated, the time available for inflation, the inflation pressured desired and the volume of the container 12 storing the gas 44. The stored gas 44 in the chamber is typically at a pressure of about 2,000 to about 8,000 pounds per square inch (psi). Preferably, the stored gas 44 in the chamber is at a pressure of about 3,500 to about 6,500 psi.

The inflator 10 includes a diffuser 60 welded to the open end 16 of the container 12. The diffuser 60 has a plurality of radially extending gas flow passages 62.

In accordance with the present invention, the burst disk 40 is made from a shape-memory alloy. In the preferred embodiment, the shape-memory alloy is nitinol. Nitinol is an alloy comprising a stoichiometric mixture of nickel and titanium, or about 55%, by weight, nickel and about 45%, by weight, titanium. Nitinol has a first mechanical strength and a second mechanical strength, less than the first mechanical strength, when electric current is applied to it.

The burst disk 40 is connected in an electrical circuit (schematically shown in FIG. 2) with a power source 64 and a normally open switch 66. The power source 64 is preferably the vehicle battery or a capacitor. The burst disk 40 and the power source 64 are both connected to the vehicle's electrical ground, as shown schematically in FIG. 2. The switch 66 is part of the crash sensor 6.

Upon the occurrence of sudden vehicle deceleration indicative of a frontal collision for which inflation of the air bag 4 is desired, the sensor 6 closes the switch 66 to transmit electric current from the power source 64 to the burst disk 40. The electric current heats the burst 40, thereby reducing the mechanical strength of the burst disk from the first mechanical strength to the second mechanical strength. When the burst disk 40 is at the second mechanical strength, the burst disk ruptures under the pressure of the stored gas 44. The burst disk 40 ruptures along the score lines 45 in the burst disk to cause petaling of the burst disk. Rupturing of the burst disk 40 enables the stored gas 44 to flow out of the chamber 42 through the opening 32 and the passages 62 into the air bag 4 to inflate the air bag 4 into a predetermined position to help protect a vehicle occupant from forcibly striking parts of the vehicle.

FIG. 3 illustrates an inflator 110 which is constructed in accordance with a second embodiment of the present invention. The inflator 110 includes a container 112 made of a suitable material, such as steel or aluminum. The container 112 includes a generally cylindrical side wall 114 extending along a central longitudinal axis 119. The side wall 114 comprises a first portion 114a welded to a second portion 114b. The side wall 114 extends between and connects an open end 116 and a closed end 118 of the container 12. The side wall 114 includes a generally cylindrical inner surface 120 and a cylindrical outer surface 122.

The open end 116 of the inflator 110 includes a first cylindrical surface 124 extending axially between and connecting the inner surface 120 and a radially extending first annular surface 126. A second cylindrical surface 128, having a diameter smaller than the diameter of the first cylindrical surface 124, extends axially between and connects the first annular surface 126 and a radially extending second annular surface 130. The second cylindrical surface 128 and the second annular surface 130 define a circular opening 132 in the container 112.

A burst disk 140, made of a suitable material such as steel or aluminum, is welded to the first annular surface 126. The burst disk 140 includes a plurality of score lines 145. The score lines 145 extend radially from the center of the burst disk 140. The burst disk 140 closes the opening 132 of the container 112 to define a closed chamber 142 in the container 112. Specifically, the chamber 142 is defined by the cylindrical inner surface 120, the first cylindrical surface 124 and the burst disk 140.

A supply of gas 144 for inflating the air bag 4 is stored in the chamber 142. The stored gas 144 preferably comprises an inert gas such as air, nitrogen, helium, argon, or a mixture of these gases. Also, preferably, the stored gas 144 includes at least a small amount of a tracer gas, such as helium, for helping to detect gas leaks, as is known.

The stored gas 144 within the container 112 is under pressure. The pressure depends upon such factors as the volume of the air bag 4 to be inflated, the time available for inflation, the inflation pressured desired and the volume of the container 112 storing the gas 44. The stored gas 144 in the chamber is typically at a pressure of about 2,000 to about 8,000 psi. Preferably, the stored gas 144 in the chamber is at a pressure of about 3,500 to about 6,500 psi.

In accordance with the second embodiment of the present invention, the inflator 110 includes a diffuser 160 suitably secured to the open end 116 of the container 112. The diffuser 160 is made of an electrically non-conductive material, such as ceramic, and has a plurality of gas flow passages 162 extending radially from a cylindrical diffuser chamber 164. The diffuser chamber 164 is in fluid communication with the opening 132.

The diffuser 160 includes a spring chamber 170 in fluid communication with a striker chamber 172. The spring chamber 170 is defined by a circular spring mounting surface 176 and an axially extending cylindrical spring guiding surface 178.

The striker chamber 172 is defined by an axially extending cylindrical housing surface 182 extending between a radially extending annular surface 184 and a radially extending annular support surface 186. The striker chamber 172 further includes a cylindrical surface 192 extending axially between the support surface 186 and a radially extending annular surface 194. An axially extending cylindrical surface 196 extends between and connects the striker chamber 172 and the diffuser chamber 164.

A load bearing member 200 is positioned on the support surface 186 by suitable means. The member 200 includes a centrally disposed opening 204. The member 200 is made from a shape-memory alloy. In the preferred embodiment, the shape-memory alloy is nitinol. The member 200, thus, has a first mechanical strength and a second mechanical strength, less than the first mechanical strength, when electric current is applied to it.

The member 200 is connected in an electrical circuit (schematically shown in FIG. 3) with a power source 206 and a normally open switch 208. The power source 206 is preferably the vehicle battery or a capacitor. The member 200 and the power source 206 are both referenced to the vehicle's electrical ground, as shown schematically in FIG. 3. The switch 208 is part of the crash sensor 6.

A striker 210 is disposed within the diffuser 160. The striker 210 is made of an electrically non-conductive material, such as ceramic, and includes a base portion 212 and a head portion 214. The base portion 212 of the striker 200 is disposed within the striker chamber 172, to the left of the member 200, as shown in FIG. 3. The head portion 214 of the striker 210 extends axially through the opening 204 in the member 200 and into the diffuser chamber 164. The head portion 214 of the striker 210 has a diameter less than the diameter of the diffuser chamber 164.

A spring 220 is disposed in the spring chamber 170. A first end 224 of the spring 220 is supported on the spring mounting surface 176 and a second end 236 of the spring is supported on the base portion 212 of the striker 210. In this arrangement, the action of the spring 220 biases the striker 210 towards the burst disk 140. The first mechanical strength of the member 200 is sufficient to resist the biasing force of the spring 220 and thus, blocks movement of the striker 210 towards the burst disk 140. The striker 210, when the member 200 has the first mechanical strength, is in a first position in which the head portion 214 of the striker 210 is spaced to the left of the burst disk 140, as shown in FIG. 3.

Upon the occurrence of sudden vehicle deceleration indicative of a collision for which inflation of the air bag 4 is desired, the sensor 6 closes the switch 208 to transmit electric current from the power source 206 to the member 200. The electric current heats the member 200, thereby reducing the mechanical strength of the member from the first mechanical strength to the second mechanical strength. The member 200, when at the second mechanical strength, can no longer resist the bias of the spring 220 and ruptures under the bias of the spring 220. Rupturing of the member 200 enables the spring 220 to urge the striker 210 to a second position which is achieved when the head portion 214 of the striker 210 is urged into the burst disk 140 with sufficient force to rupture the burst disk along the score lines 145.

Rupturing of the burst disk 140 enables the stored gas 144 to flow out of the chamber 142 through the opening 132 into the diffuser chamber 164 and through the passages 162 into the air bag 4 to inflate the air bag 4 into a predetermined position to protect a vehicle occupant from forcibly striking parts of the vehicle.

From the above description of the invention, those skilled in the art will perceive improvements, changes and modifications. Such improvements, changes and modifications within the skill the of the art are intended to be covered by the appended claims.

Having described the invention, the following is, claimed:

1. An apparatus for helping to protect a vehicle occupant, said apparatus comprising:

an inflatable vehicle occupant restraint;

an inflator having a chamber;

a stored inflation fluid, for inflating said restraint, disposed in said chamber; and means for controlling flow of said inflation fluid from said chamber to said restraint including a member which has a first mechanical strength when no electric current is applied to said member and a second mechanical strength lower than said first mechanical strength when electric current is applied to said member.

2. An apparatus as defined in claim 1 wherein said inflation fluid is stored under pressure in said chamber;

said inflator has an opening through which said inflation fluid flows into said restraint; and said member comprises a burst disk which has said first mechanical strength blocking said opening and which ruptures due to the pressure of said inflation fluid in response to said burst disk acquiring said second mechanical strength.

3. An apparatus as defined in claim 1 wherein said inflation fluid is stored under pressure in said chamber, said inflator has an opening through which said inflation fluid flows into said restraint, and further including a burst disk blocking flow of inflation fluid through said opening.

4. An apparatus as defined in claim 3 further including a striker for striking said burst disk to rupture said burst disk, said striker having a first position in which said burst disk is not ruptured, and said member holding said striker in said first position when said member has said first mechanical strength.

5. An apparatus as defined in claim 4 further including a spring biasing said striker against said member, said member resisting said spring bias when said member has said first mechanical strength and being unable to resist said spring bias when said member has said second mechanical strength.

6. The apparatus as defined in claim 2 wherein said burst disk is made of a shape memory alloy.

7. The apparatus as defined in claim 1 further comprising means for directing electric current to said member.

8. An apparatus for helping to protect a vehicle occupant, said apparatus comprising:

an inflatable vehicle occupant restraint; and an inflator for providing inflation fluid for inflating said restraint, said inflator being free of any pyrotechnically operated device;

a stored inflation fluid, for inflating said restraint, disposed in said chamber; and means for controlling flow of said inflation fluid from said chamber to said restraint including a member made of a shape-memory alloy, said member being fixed to said inflator and connected to a source of electric current.

9. The apparatus as defined in claim 2 wherein said member has a first mechanical strength when no electric current is applied to said member and a second mechanical strength lower than said first mechanical strength when electric current is applied to said member.

10. An apparatus as defined in claim 9 wherein said inflation fluid is stored under pressure in said chamber;

said inflator has an opening through which said inflation fluid flows into said restraint; and said member comprises a burst disk which has said first mechanical strength blocking said opening and which ruptures due to the pressure of said inflation fluid in response to said burst disk acquiring said second mechanical strength.

11. An apparatus as defined in claim 9 wherein said inflation fluid is stored under pressure in said chamber, said inflator has an opening through which said inflation fluid flows into said restraint, and further including a burst disk blocking flow of inflation fluid through said opening.

12. An apparatus as defined in claim 11 further including a striker for striking said burst disk to rupture said burst disk, said striker having a first position in which said burst disk is not ruptured, and said member holding said striker in said first position when said member has said first mechanical strength.

13. An apparatus as defined in claim 12 further including a spring biasing said striker against said member, said member resisting said spring bias when said member has said first mechanical strength and being unable to resist said spring bias when said member has said second mechanical strength.

14. The apparatus as defined in claim 8 wherein said shape memory alloy comprises nickel and titanium.

* * * * *